April 19, 1927.  1,625,391
J. B. REILLY ET AL
TOOL FOR CUTTING AND REMOVING PIPE FROM WELLS
Filed July 19, 1923    4 Sheets-Sheet 2
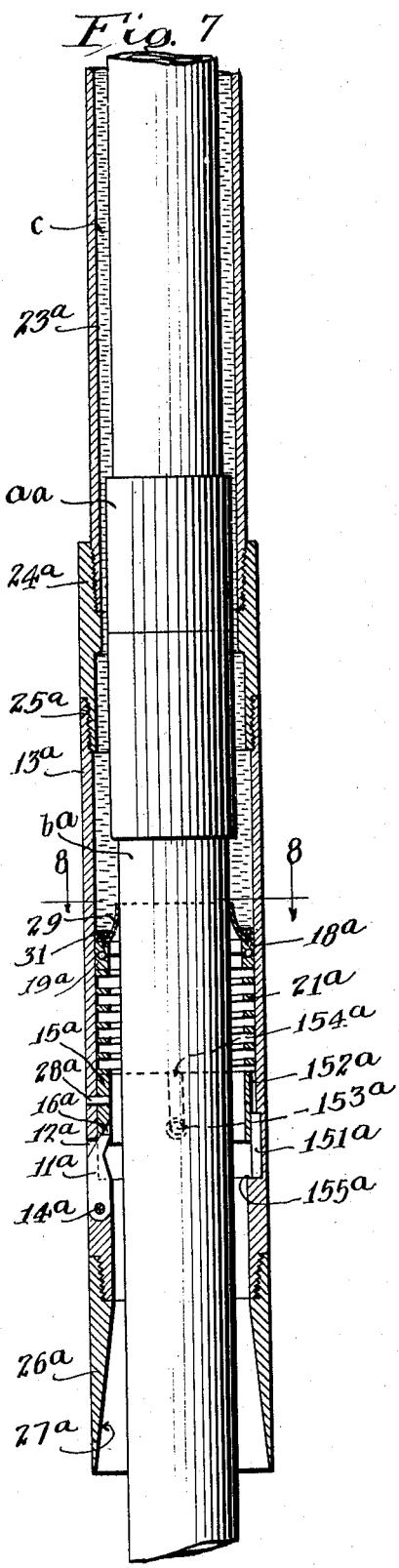
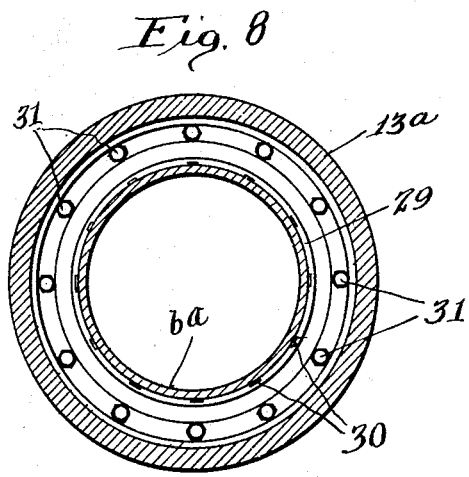
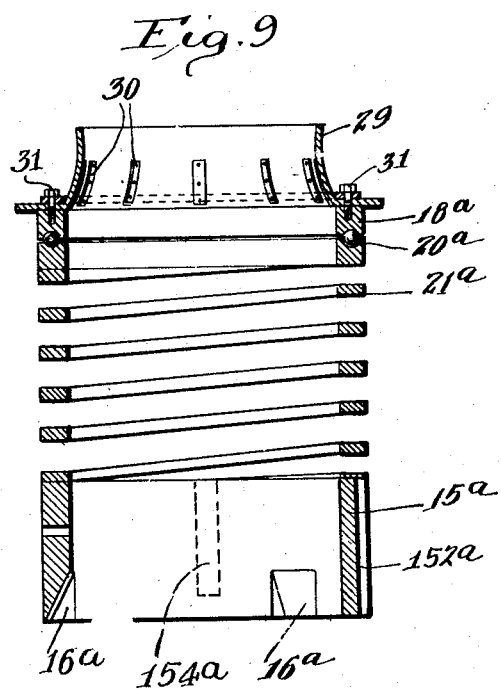
Inventors
John B. Reilly
Charles H. Stone
By Lyon & Lyon
Attorneys

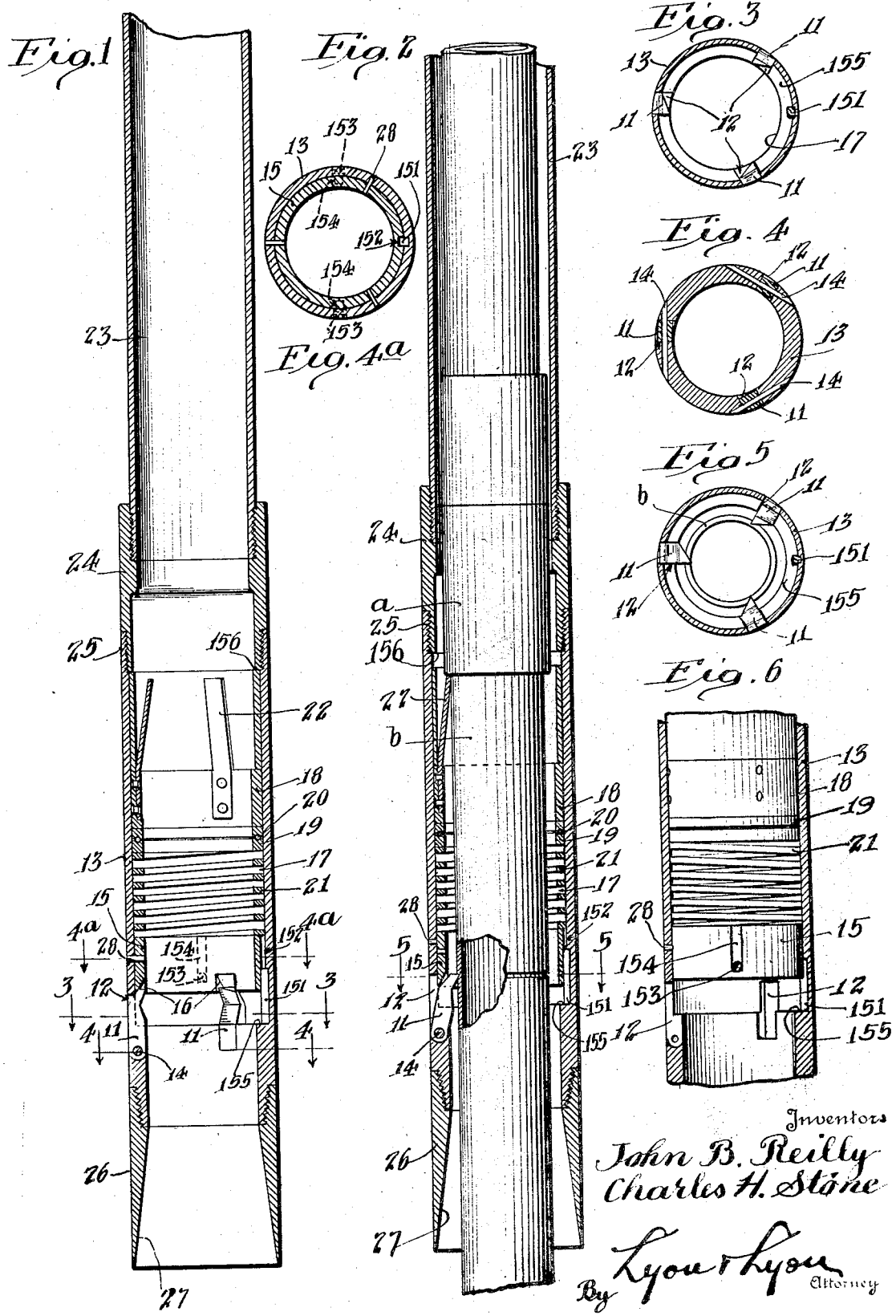

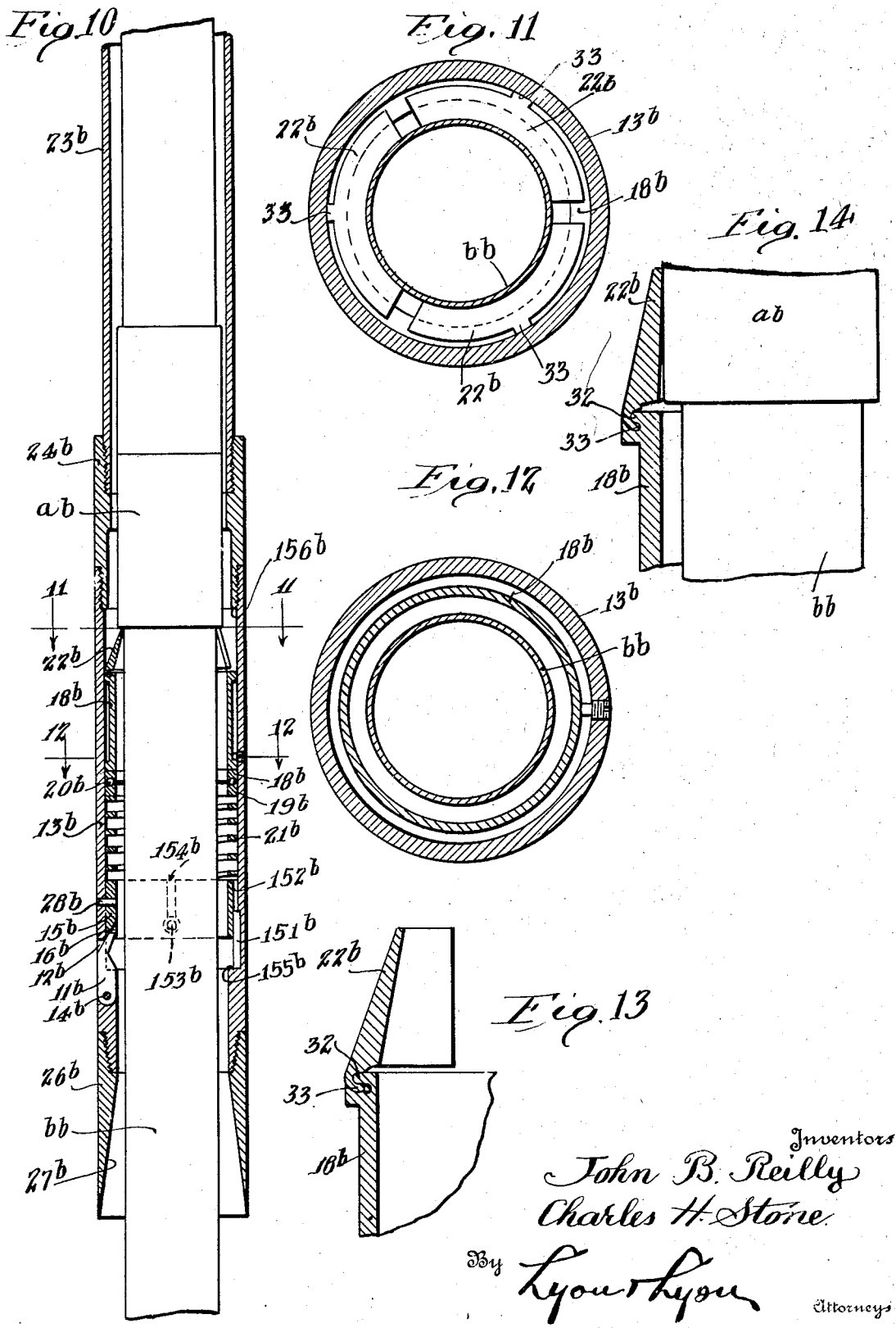

April 19, 1927.  J. B. REILLY ET AL  1,625,391
TOOL FOR CUTTING AND REMOVING PIPE FROM WELLS
Filed July 19, 1923   4 Sheets-Sheet 4
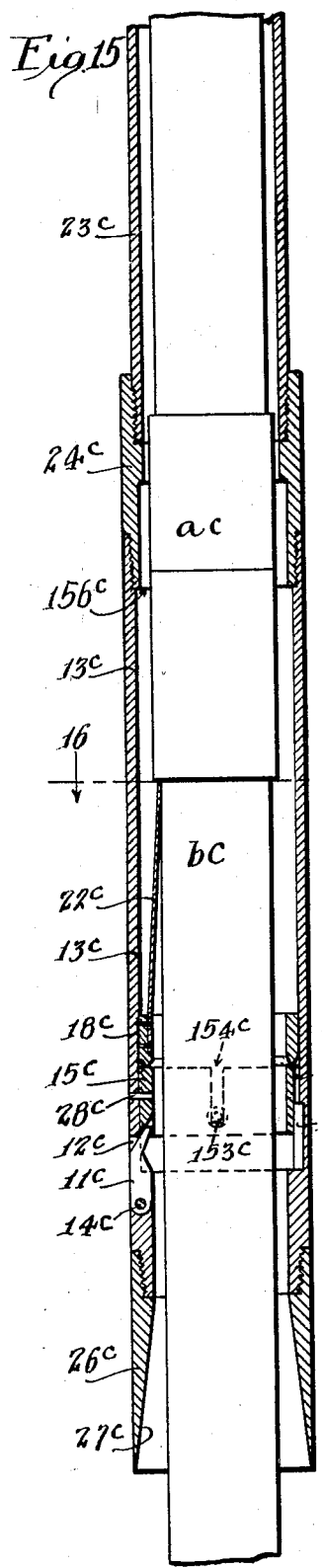
Inventors
John B. Reilly
Charles H. Stone
By Lyon & Lyon Attorneys Patented Apr. 19, 1927.

1,625,391

UNITED STATES PATENT OFFICE.

JOHN B. REILLY, OF WHITTIER, AND CHARLES H. STONE, OF BREA, CALIFORNIA, ASSIGNORS TO KAMMERER CORPORATION, OF SANTA FE SPRINGS, CALIFORNIA, A CORPORATION OF CALIFORNIA.

TOOL FOR CUTTING AND REMOVING PIPE FROM WELLS.

Application filed July 19, 1923, Serial No. 652,511, and in Great Britain October 8, 1923.

This invention relates to that type of tool employed in the well drilling art for cutting pipe in the well, and it can also be used for removal of cut-off sections of the pipe. Such a tool is in frequent demand for cutting the drill pipe or stem when it becomes stuck in the hole.

The invention is an improvement over that disclosed in United States Letters Patent No. 1,277,600, issued to George Kammerer September 3, 1918. This application is a continuation in part of our earlier application Serial No. 584,277 filed August 25, 1922.

An important object of the invention is to simplify the tool, reducing the number of working parts so as to make it less liable to get out of order when in use.

Another important object is to mount the cutter blades in a manner to permit of the tool being inserted in a casing of small diameter relative to the diameter of the pipe to be cut within the casing.

Another object is to provide for holding of the cutter blade actuating member in retracted position and for release thereof by upward motion of the tool body.

Another object is to make provision for automatic and semi-automatic feeding of the cutter blades to the pipe or stem being cut.

Another object is to provide for cutting of the pipe at any desired point without the necessity of co-action between the tool and the pipe collar or coupling.

Other objects and advantages will appear in the subjoined detailed description.

The accompanying drawings illustrate several different forms of the invention:

Figure 1 is a longitudinal section of a tool embodying the invention, a fragment of the member for rotating it also being shown. The parts are in the positions they occupy when the tool is being lowered into the well.

Fig. 2 is a sectional elevation similar to Figure 1 with the parts in the positions they occupy after the cutter blades have been moved into engagement with the pipe that is to be operated on, a fragment of the pipe being shown partly in section.

Figs. 3, 4 and 4ª are plan sections on the lines indicated by 3—3, 4—4 and 4ª—4ª, respectively, Figure 1.

Figure 5 is a plan section on the line indicated by 5—5, Figure 2.

Fig. 6 is a fragmental longitudinal view of the tool, showing the tubular body in section and the parts within the tubular body in elevation. The cutter blades are omitted from their slots.

Fig. 7 is a sectional elevation of a modified form of tool embodying the invention, a fragment of the member for rotating the tool also being shown. The tool is shown in place around the pipe that is to be cut. The fluid for producing pressure within the tool for feeding of the cutter blades is indicated.

Fig. 8 is an enlarged plan section on the line indicated by 8—8, Figure 7.

Fig. 9 is an enlarged sectional elevation of the bearing with its diaphragm, together with the spring and blade-actuating member.

Fig. 10 is a sectional elevation of a third form of tool embodying the invention, some of the parts being shown in the positions they occupy when the tool is being lowered around the pipe that is to be cut, a fragment of which is also shown.

Figs. 11 and 12 are enlarged plan sections on the lines indicated by 11—11, 12—12, Figure 10.

Fig. 13 is an enlarged sectional detail of one of the arms or dogs in Fig. 10 adapted to engage a shoulder on the member that is to be cut, a portion of the member on which the dog is movably mounted also being shown in section.

Fig. 14 is a sectional detail similar to Fig. 13 showing the dog in retracted position in contact with the periphery of the collar or coupling of the pipe, a fragment of which is shown in elevation.

Fig. 15 is a sectional elevation of a fourth form of tool embodying the invention, a fragment of the member for rotating it also being shown and the parts being in the positions they occupy when the tool is being lowered around the pipe that is to be cut, a fragment of which is also shown in elevation.

Fig. 16 is a plan section on the line indicated by 16—16, Figure 15.

The form of the invention illustrated in Figures 1 to 6 inclusive will first be described. There is provided any desired number of cutter blades 11 movably mounted in longitudinally extending slots 12 in a tubular body 13. In this instance the cutter blades 11 are rotatably mounted in the slots 12 being pivoted at 14 to the body 13. The tubular body 13 is adapted to be lowered over the pipe or drill stem that is to be cut. The pipe or drill stem that is to be cut will be maintained substantially concentric of the body 13, while the cutting operation is progressing, because of the provision of a plurality of the cutter blades 11, there being, in this instance, three such blades arranged equidistantly around the body. The cutter blades 11 preferably extend upwardly from their pivots 14 so that, even though the cutter blades were to swing inwardly into engagement with the pipe over which the tool is being lowered, said cutter blades will not catch, as the tool is lowered, upon any shoulders or other projections that may be on the pipe. The cutter blades will drag over the pipe couplings during downward motion of the tool and will be deflected outwardly by engagement with such couplings. Thus, by this construction and arrangement of the cutter blades, I avoid the necessity of employing springs for holding the cutter blades retracted.

To positively force the cutter blades inwardly into engagement with the pipe or stem that is to be cut, there are provided cutter blade-actuating means comprising, in this instance, a blade-engaging member 15. Though said blade-engaging member may be of any suitable shape, we prefer to make it annular, as shown. When the member 15 is held stationary and the member 13 is raised, said member 15 engages the upper ends of the cutter blades 11 and rotates said blades inwardly and downwardly to the cutting position, as in Figure 2. Preferably the lower end of the member 15 is provided with notches 16, the outer walls of which are beveled inwardly and upwardly. These slots register with the blades 11 and the beveled walls function as cam faces for engaging the cutter blades. Preferably the upper ends of the cutter blades are beveled complementarily to the beveled walls of the slots 16 so that the blades will ride smoothly on said beveled walls.

The upper portion of the tubular body 13 is of enlarged internal diameter, as indicated at 17, and within this enlarged portion is mounted a bearing comprising upper and lower tubular ball race members 18, 19 and balls 20 between them so as to constitute an antifriction bearing.

Between the lower bearing member 19 and the blade-engagement member 15 is interposed a coil spring 21. The body 13 can be rotated around the bearing member 18 which carries a number of yieldable arms 22 secured at their lower ends to said bearing member. These arms 22, in this instance, extend aslant upwardly and inwardly so that when the tool is raised, after lowering around the pipe $b$ that is to be cut, said arms engage beneath one of the couplings $a$ of the pipe $b$. The arms 22 may be of any suitable construction and are yieldingly held in engagement with the pipe that is to be cut. This is effected by suitable springs and, in this instance, the arms 22 themselves constitute spring members, but it is to be understood that the arms and springs may be separate, a mechanical equivalent that is readily understood without special illustration and description. In this instance three arms 22 are employed, though it is to be understood that the number may be increased or diminished, if desired.

The upper end of the tubular body 13 is suitably connected to an operating member which, in this instance, is formed by tubing 23, the connection with the tubing being effected by a coupling 24 to which the body 13 is screwed as indicated at 25.

In the drawings the body 13 is formed, in part, by a shoe 26 which is internally beveled outwardly and downwardly at its lower end at 27 so that, if the shoe strike an obstruction while it is descending, it will cut the obstruction away.

The member 15 is temporarily secured to the body 13, while the tool is being lowered into the well, so as to prevent relative movement between the cutter blades and the cutter blade engaging member 15, thus avoiding actuating of the blades. In this instance the relative motion is prevented by a shear pin or pins 28 connecting the body 13 to the member 15.

The member 15 is prevented from turning relative to the body 13 by a spline 151 fixed in said body and projecting into a splineway 152 in the outer face of the member 15. To limit upward motion of the member 15, after shearing of the pins 28, as will be made clear hereinafter, the body 13 is provided with screws 153 projecting into slots 154 in the member 15, said slots terminating above the lower end of said member.

To limit downward motion of the member 15, after shearing of the pins 28, the body 13 is provided with an internal shoulder 155 to engage the lower end of the member 15.

In practice, when it is desired to cut a string of pipe in the well, for example, a drill stem, the tool with the shear pins 28 in place will be lowered over the drill stem by means of the tubing 23 to approximately the level at which the stem is to be cut. Then the tool will be raised to bring the upper ends of the arms 22 into engagement with the shoulder formed by the lower end of the coupling a, to effect shearing of the pins 28 and thus release the body 13 from the member 15. The cam faces of the slots 16 then function as wedges to force the cutter blades inwardly against the drill stem. Then the tubing 23 will be rotated by any of the usual mechanisms employed for rotating drill stems, or by other suitable mechanism, so as to cause the cutter blades 11 to cut the drill stem, the cam faces of the slots 16 operating, as the spring 21 automatically feeds the member 15, to gradually feed the cutter blades toward the drill stem as the depth of the cut increases. The expansive force of the spring 21 may be increased at any time, if found desirable, by further raising of the body 13 to compress the spring to a greater degree between the member 15 and bearing member 19. When the cutting of the drill stem is being effected, the cutter blades 11 will not be forced to take too deep a cut, and thus endanger breaking of the cutter blades, since the spring 21 will yield as the body 13 is raised. Thus it will be clear that the cutter blades are yieldingly held and automatically fed toward their work though, at the same time the feed may be more or less controlled by raising of the body 13 slower or faster.

After the cutting operation has been completed, the tubing 23 will be withdrawn from the well and with it the body 13 and its associated parts and, since the arms 22 engage beneath the coupling a, this withdrawing movement causes the upper cut off section of the drill stem or "fish" as it is commonly termed in this art, to be raised at the same time until the upper end of said fish is above the top of the well, whereupon the fish will be hoisted out of the well. If it be necessary to remove more of the drill stem, the tool will be lowered again so as to make another cut and raise the fish. Thus the cutting operations and raising of the cut-off sections of the drill stem will be continued until the well is cleared of the same, or as much of it as it is desired to remove. If the arms 22 bend sufficiently under the weight of the fish, during the raising thereof, the cutter blades themselves will operate to raise the cut off section, since said cutter blades will project beneath the cut end of the fish and the blades will be supported by the member 15, which rests upon the shoulder 155.

It is to be especially noted that, when the cutter blades are collapsed, they are in approximately vertical position or parallel with the pipe that is to be cut, thus occupying much less radial space than when in cutting position and enabling the tool to be inserted in a casing of comparatively small diameter.

When the tool is being lowered into the well, upward movement of the member 18 relative to the body 13, caused, for example, by friction between the arms 22 and the pipe, is limited by reason of the member 18 engaging an internal shoulder 156 formed by the lower end of the coupling 24.

Any projections on the pipe will not catch and hold the member 15 in the downward travel of the tool and thus shear the pins 28 because of the screws 153 engaging the lower ends of the slots 154.

In the above description the tubular members 13, 15 are seen to be relatively movable. The cutter blades are rotatable from collapsed position into cutting position by relative movement between the members 13, 15, and are further rotatable by relative movement between the members 13, 15 to cut the pipe, the arms 22 are connected with the cutter blade actuating member 15 and engage the shoulders formed by one end of the coupling a to hold the member 15 against longitudinal movement relative to the pipe, and the tubing 23 constitutes means connected with the member 13 to move said member.

Now referring more particularly to the form of the invention illustrated in Figures 7, 8 and 9, the elements having the same functions as those described above will be designated by the same reference characters with letter indices "a," thus avoiding the necessity of repeating the description that applies to both forms. In this instance the pipe coupling is not relied upon for holding the blade-actuating member while the tool body is raised. Instead of the arms 22, previously described, the upper bearing member 18$^a$ is provided with a suitable flexible packing collar 29 adapted to surround and engage the pipe around which the tool is lowered so as to pack off the space above the bearing member 18$^a$ from the space below said bearing member. The collar 29 may be made of leather or other suitable material and, in this instance, is stiffened somewhat by metal strips 30 secured at intervals to the inner face of the collar, as clearly shown in Figure 9. The metal strips 30 also function to take the wear occasioned by friction between the collar and the pipe. The collar 29 is secured by screws 31 or other fasteners to the upper bearing member 18$^a$.

To cut pipe with the form of the invention illustrated in Figures 7 to 9, the tool will be lowered, as before described, to approximately any position at which the cut is to be made and then a fluid, indicated at c in Figure 7, will be discharged into the tubing 23$^a$ so as to fill the space between the tubing 23$^a$ and the pipe b a that is to be cut. Then the tubing 23$^a$ will be raised against the pressure of fluid on the collar 29 so as to force the cutter blades inwardly, as before described. The pressure of the fluid *c* holds the member 15ᵃ as the body 13ᵃ is being raised. Other than this the operation is the same as for the form of the invention shown in Figures 1 to 6.

The form of the invention illustrated in Figures 10 to 13 inclusive will now be described, the elements functioning the same as those previously described being indicated by the same reference characters with letter indices "b". This avoids the necessity of describing elements that have been hereinbefore fully described. The bearing member 18ᵇ is provided at its upper end with yieldable arms 22ᵇ in the form of pivotally mounted dogs of semicircular form. The dogs 22ᵇ have a pivotal connection with the bearing member 18ᵇ so that said dogs can swing toward and from the axis of the tool. In this instance, the pivotal connection is formed by inter-engaging tongues 32, 33 on the bearing member 18ᵇ and dogs 22ᵇ. The tongues 32, 33 are constructed with curved faces, the curves being drawn from a common center so that the dogs will move freely on their connections. This construction is clearly shown in Figure 13. In operation, when lowering the tool around the pipe to be cut, the dogs 22ᵇ will readily drag upon the outer face of the pipe, the couplings of said pipe thrusting the dogs outwardly, as in Fig. 14. When the tool body 13ᵇ is raised to effect shearing of the pins 28ᵇ, the dogs 22ᵇ will engage the shoulder formed by the lower end of the coupling *a*ᵇ, as in Fig. 10. Thus, this form of the invention functions exactly the same as the form first described.

The form of the invention illustrated in Figures 15 and 16 will now be described, the elements that function the same as those described in connection with Figures 1 to 6 being designated by the same reference characters as employed in said figures with the addition of letter indices "c". The principal differences between this form of the invention and that illustrated in Figures 1 to 6 is the omission of the coil spring between the cutter blade actuating member 15ᶜ and member 18ᶜ corresponding to the upper bearing member 18 in Figure 1, and the omission of the antifriction bearing. In this instance the member 18ᶜ bears directly against the member 15ᶜ. The member 18ᶜ is provided with spring arms 22ᶜ which function the same as the arms 22 previously described.

In describing above the operation of the form of the invention illustrated in Figs. 7, 8 and 9, mention was made of holding the cutter blade-actuating member against upward movement by the fluid pressure upon the collar 29 while raising the tool body. It is, however, to be understood that, since relative movement between the body and blade-actuating member is what causes release of the blade-actuating member from the body and feeding of the cutter blades to their work, the tool body may be held against downward motion and the fluid pressure increased to a degree that will effect shearing of the pins 15ᵃ and consequent release of the blade-actuating member and feeding of the cutter blades.

We claim:

1. A tool of the class described comprising relatively movable members, pivoted cutter blades oscillatable from collapsed position into cutting position by relative movement between the members, yieldable arms on one of the members engageable with a shoulder on the pipe that is to be cut, and means connected with the other member to move said other member.

2. A tool of the class described comprising relatively movable members, pivoted cutter blades oscillatable from collapsed position into cutting position by relative movement between the members and further rotatable by relative movement between the members to cut pipe positioned between the cutter blades, yieldable arms connected with one of the members engageable with a shoulder on the pipe, and means connected with the other member to move said other member.

3. A tool of the class described comprising relatively movable members, cutter blades mounted for turning from collapsed position into cutting position by relative movement between the members, yieldable arms on one of the members engageable with a shoulder on the pipe that is to be cut, and means connected with the other member to move said other member.

4. A tool of the class described comprising relatively movable members, cutter blades mounted to turn from collapsed position into cutting position by relative movement between the members and further turned by relative movement between the members to cut pipe positioned between the cutter blades, yieldable arms connected with one of the members engageable with the pipe to hold said member against movement in one direction, and means connected with the other member to move said other member in said direction.

5. A tool of the class described comprising a tubular body adapted to slip over a pipe, and means including a pivoted cutter blade operative by raising of the tubular body to cut the pipe and thereafter operative to raise the cut-off portion of the pipe, said cutter blade being pivoted at its lower end so as to swing outwardly, and slip over obstructions on the pipe when the tool is being lowered into cutting position.

6. A tool of the class described comprising a tubular body adapted to slip over a pipe, a cutter blade pivoted in the body to lie approximately longitudinally of the body, means to rotate the tubular body, and yieldable means engageable with a shoulder on the pipe to rotate the cutter blade into engagement with the pipe.

7. A tool of the class described comprising a tubular body adapted to slip over a pipe, a cutter blade pivotally supported at its lower portion so as to swing outwardly or to lie approximately longitudinally of the body with its cutting edge pointing upwardly, means to rotate the tubular body, and means to rotate the cutter blade into engagement with the pipe.

8. A tool of the character described comprising a tubular body adapted to slip over a pipe, a cutter blade mounted for movement with respect to the body, means operable by vertical movement of the body in one direction to feed the cutter blade toward the pipe, and means releasable by said vertical movement under only realtively great pressure to prevent operation of the first mentioned means, the first mentioned means including a spring operating when the second mentioned means is released to automatically feed the cutter blade toward the pipe.

9. A tool of the class described comprising a tubular body, means to rotate and raise the tubular body, a cutter blade mounted to turn in the tubular body, a blade-actuating member inside of the body to engage and turn the cutter blade, and yieldable means connected with the blade-actuating member for engaging the pipe to resist movement of the blade-actuating member while the body is being raised.

10. A tool of the class described comprising a tubular body, means to rotate and raise the tubular body, a cutter blade mounted to turn in the tubular body, a blade-actuating member inside of the body having a notch to engage the cutter blade, and yieldable means connected with the blade-actuating member for engaging the pipe to resist movement of the blade-actuating member while the body is being raised.

11. A tool of the class described comprising a tubular body, means to rotate and raise the tubular body, a cutter blade mounted to turn in the tubular body, a blade-actuating member inside of the body having a notch to engage the cutter blade, the outer wall of the notch being beveled inwardly and upwardly, and yieldable means connected with the blade-actuating member for engaging the pipe to resist movement of the blade-actuating member while the body is being raised.

12. A tool of the class described comprising a tubular body, means to rotate and raise the tubular body, a cutter blade movably mounted in the tubular body and adapted to lie retracted approximately longitudinally of the body, and means including a spring operable by upward movement of the tubular body to move the cutter blade from retracted position to cutting position, the expansion of the spring thereafter operating as the sole power to feed the cutter blade inwardly.

13. A tool of the character described comprising a tubular body, a cutter blade shiftably mounted to move toward and from the axis of said body, means to actuate the cutter blade, and a dog pivotally connected with the cutter blade actuating means to engage a drill stem to hold the blade actuating means against upward movement.

14. A tool of the character described comprising a body, a cutter blade movably mounted in the body, a cutter blade actuating member shiftably mounted in the body and engageable with the blade to operate said blade, means to releasably hold the blade-actuating member from operating the cutter, said means being released by relative movement between the blade-actuating member and body, and means to hold the blade-actuating member against longitudinal movement relative to the pipe being operated on.

15. A tool of the character described comprising a body, a cutter blade movably mounted in the body, a cutter blade-actuating member shiftably mounted in the body and engageable with the blade to operate said blade, a spring to move the blade-actuating member toward the cutter blade, means to releasably hold the blade-actuating member against the pressure of the spring, said means being released by relative movement between the blade-actuating member and body, and means to hold the spring against longitudinal movement along the pipe being operated on.

16. A tool of the character described comprising a body, a cutter blade movably mounted in the body, a cutter blade-actuating member shiftably mounted in the body and engageable with the blade to operate said blade, a shear pin connecting the body and blade-actuating member, and means to hold the blade-actuating member against longitudinal movmeent relative to the pipe being operated on.

17. A tool of the character described comprising a tubular body, a cutter blade rotatably mounted in the tubular body, and means including a spring operatable by raising of the tubular body to rotate the cutter blade from retracted position to cutting position, said spring operating to feed the cutter blade.

18. A tool of the character described comprising relatively movable members, cutter blades rotatable from collapsed position into cutting position by relative movement between the members, yieldable arms on one of the members engageable with the pipe that is to be cut to hold said member against movement, and means connected with the other member to move said other member.

19. A tool of the class described comprising relatively movable members, a cutter blade rotatably mounted in one of said members, the other member having a notch to engage the cutter blade, and yieldable means connected with one of said members for engaging a projection on the pipe to hold said member against movement.

20. A tool of the class described comprising relatively movable members, a cutter blade rotatably mounted in one of said members, the other member having a notch and the outer wall of the notch being beveled and engaging the cutter blade, and yieldable means connected with one of said members for engaging a projection on the pipe to hold said member against movement.

21. A tool of the class described comprising relatively movable members, a cutter blade movably mounted in one of said members and adapted to lie retracted approximately longitudinally thereof and to be engaged by the other member, and means including a spring operable by relative movement between said members to move the cutter blade from retracted position to cutting position, the spring thereafter operating to feed the cutter blade inwardly.

Signed at Brea, California, this 9th day of July 1923.

JOHN B. REILLY.
CHARLES H. STONE.